United States Patent
Rossin

(10) Patent No.: US 10,639,582 B2
(45) Date of Patent: May 5, 2020

(54) REMOVAL OF HYDROGEN SULFIDE FROM PROCESS STREAMS

(71) Applicant: Guild Associates, Inc., Dublin, OH (US)

(72) Inventor: Joe Rossin, Plain City, OH (US)

(73) Assignee: GUILD ASSOCIATES INC., Dublin, OH (US)

(*) Notice: Subject to any disclaimer, the term of this patent is extended or adjusted under 35 U.S.C. 154(b) by 0 days.

(21) Appl. No.: 16/251,643

(22) Filed: Jan. 18, 2019

(65) Prior Publication Data

US 2019/0151793 A1 May 23, 2019

Related U.S. Application Data

(62) Division of application No. 15/072,339, filed on Mar. 16, 2016, now Pat. No. 10,232,311.

(51) Int. Cl.
| | |
|---|---|
| *B01D 51/10* | (2006.01) |
| *B01D 53/02* | (2006.01) |
| *B01D 53/04* | (2006.01) |
| *B01D 53/34* | (2006.01) |
| *B01D 53/52* | (2006.01) |
| *B01D 53/82* | (2006.01) |
| *B01D 53/96* | (2006.01) |

(52) U.S. Cl.
CPC ......... *B01D 53/0454* (2013.01); *B01D 51/10* (2013.01); *B01D 53/02* (2013.01); *B01D 53/346* (2013.01); *B01D 53/52* (2013.01); *B01D 53/82* (2013.01); *B01D 53/96* (2013.01); *B01D 2251/604* (2013.01); *B01D 2253/112* (2013.01); *B01D 2253/1124* (2013.01); *B01D 2256/245* (2013.01); *B01D 2257/304* (2013.01); *B01D 2258/05* (2013.01); *Y02E 50/346* (2013.01)

(58) Field of Classification Search
None
See application file for complete search history.

(56) References Cited

U.S. PATENT DOCUMENTS

| | | | |
|---|---|---|---|
| 4,374,106 A | 2/1983 | Tipton et al. | 423/231 |
| 5,151,247 A | 9/1992 | Haglund et al. | 419/13 |
| 2013/0272943 A1 | 10/2013 | Braga | 423/242.2 |

*Primary Examiner* — Daniel Berns

(74) *Attorney, Agent, or Firm* — Slayden Grubert Beard PLLC

(57) ABSTRACT

Disclosed are processes for gas streams containing $H_2S$, the processes comprise contacting the gas streams with a mixed metal oxy-hydroxide media comprising two or more metals selected from the group consisting of iron, copper and silicon.

8 Claims, No Drawings

REMOVAL OF HYDROGEN SULFIDE FROM PROCESS STREAMS

RELATED PATENT APPLICATION

This application is a Divisional of U.S. patent application Ser. No. 15/072,339; filed Mar. 16, 2016; which is hereby incorporated by reference herein for all purposes.

FIELD OF INVENTION

This invention relates to a novel processes for the removal of hydrogen sulfide ($H_2S$) from gas streams. The novel processes involve contacting $H_2S$ laden gas streams with a porous mixed-metal oxy-hydroxide comprised of magnesium, chromium, manganese, iron, cobalt, zinc or copper, or mixtures thereof, and preferably promoted with silicon, aluminum, titanium or zirconium, or mixtures thereof. It is preferred that the $H_2S$ laden gas stream contains threshold levels of $O_2$ and water to promote the life of the media, otherwise, media can be regenerated to increase the $H_2S$ removal capacity.

BACKGROUND OF THE INVENTION $H_2S$ is present in a number of industrial gas streams that include landfill gas, digester gas, natural gas, coal gas and sewer gas, for example. $H_2S$ can be removed from gas streams by contacting said gas streams with solid adsorbents comprising oxides, hydroxides, carbonates, or mixtures thereof of magnesium, chromium, manganese, iron, cobalt, zinc and/or copper wherein said metals present as oxides, hydroxides, carbonate, or mixtures thereof, are able to form sulfides upon contact with $H_2S$. Iron, zinc and copper are the preferred metals. As an example, hydroxides of iron, zinc and copper will react with $H_2S$ to yield the corresponding metal sulfide. These reactions proceed as follows:

$$2FeOOH + 3H_2S \rightarrow Fe_2S_3 + 4H_2O \quad (1)$$

$$Zn(OH)_2 + H_2S \rightarrow ZnS + 2H_2O \quad (2)$$

$$Cu(OH)_2 + H_2S \rightarrow CuS + 2H_2O \quad (3)$$

The above reactions are known to one skilled in the art. In treating process gas containing $H_2S$, it is desirable that oxygen and water be present in order to improve the $H_2S$ removal capacity of the media via regeneration of the active sites. Otherwise, the $H_2S$ removal capacity of the media will be limited to the number of available reaction sites. Regeneration reactions involving water and oxygen are postulated to proceed as follows:

$$Fe_2S_3 + 3H_2O \rightarrow Fe_2(SH)_3(OH)_3$$

$$Fe_2(SH)_3(OH)_3 + 9/2O_2 \rightarrow Fe_2O_3 + 3SO_2 + 3H_2O$$

$$\text{or } 2FeOOH + 3 SO_2 + 2H_2O$$

$$\text{or } Fe_2(SO_3)_3 + 3H_2O \quad (4)$$

$$ZnS + H_2O \rightarrow Zn(SH)(OH)$$

$$Zn(SH)(OH) + 3/2O_2 \rightarrow ZnO + SO_2 + H_2O$$

$$\text{or } Zn(OH)_2 + SO_2$$

$$\text{or } ZnSO_3 + H_2O \quad (5)$$

$$CuS + H_2O \rightarrow Cu(SH)(OH)$$

$$Cu(SH)(OH) + 3/2O_2 \rightarrow CuO + SO_2 + H_2O$$

$$\text{or } Cu(OH)_2 + SO_2$$

$$\text{or } CuSO_3 + H_2O \quad (6)$$

From the above reaction sequences, the metal sulfide is first hydrated with water, then oxidized to yield the metal oxide plus sulfur dioxide, the metal hydroxide plus sulfur dioxide, and/or metal sulfite. Sulfur dioxide will then react with $H_2S$ to yield elemental sulfur plus water, whereas the metal sulfite will react with $H_2S$ to yield elemental sulfur and the corresponding metal oxide and/or hydroxide:

$$SO_2 + 2H_2S \rightarrow 3S + 2H_2O \quad (7)$$

or $$MSO_3 + 2 H_2S \rightarrow MO + 3S + 2H_2O$$

$$\text{or } M(OH)_2 + 3S \quad (8)$$

wherein $MSO_3$ represents a metal sulfite. From the above reaction schemes, note that the $O_2/H_2S$ ratio is 1.5. Thus, it becomes necessary that the concentration of oxygen present in the process stream be at least 50% greater than the concentration of $H_2S$ in order to facilitate the regeneration reactions (equations 4 through 6). Should insufficient oxygen be present in the process steam, an oxygen source, such as air, may be added to achieve the desired $O_2$ level. Water is necessary in order to hydrate the metal sulfide complex, allowing for the regeneration reactions (with oxygen) to proceed.

Should it not be feasible to add oxygen, the $H_2S$ removal media can be regenerated by taking the media off-line and exposing the spent media to air at the target flow rate and temperature for the duration necessary to regenerate the media.

Metal complexes that are able to facilitate the removal of $H_2S$ (e.g., iron) are typically loaded onto the external surface or dispersed within the pores of a substrate to yield a material with a capacity to remove $H_2S$ via the above chemical reaction. Examples of porous substrates include activated carbon, silicon dioxide and aluminum oxide. Iron sponge, namely iron oxide or hydroxide loaded onto wood chips or shavings, is also employed in the removal of $H_2S$ from process streams. While said materials may be considered effective, they are limited in their capacity to remove $H_2S$ by the amount of metal that can be effectively incorporated into the substrate. Therefore, metal loadings are limited to typically on the order of 10% by weight. This often limits the capacity of the material for the removal of $H_2S$ to typically on the order of 20% by weight $H_2S$ on a mass basis. The capacity is limited because the reactive site becomes hindered due to the presence of product elemental sulfur. Mixed metal oxy-hydroxides have the potential to overcome these deficiencies by having the structure comprised of reactive moieties.

SUMMARY OF THE INVENTION

The invention described herein relates to novel processes for removing $H_2S$ from gas streams. Said process involves contacting $H_2S$ laden process streams with a mixed metal oxy-hydroxide comprised of magnesium, chromium, manganese, iron, cobalt, zinc and/or copper, with iron, zinc and copper being preferred. It is also preferred to promote the mixed metal oxy-hydroxide with aluminum, silicon, titanium and/or zirconium, as said metals were found to promote porosity.

According to some embodiments, the present invention comprises processes for removing $H_2S$ from gas streams containing $H_2S$, the processes comprising (i) measuring the $O_2/H_2S$ molar ratio in the $H_2S$ containing gas stream to determine if the $O_2/H_2S$ molar ratio is less than about 1.5; (ii) mixing air or oxygen into the $H_2S$ containing gas stream at a rate to achieve an $O_2/H_2S$ molar ratio equal to or greater than about 1.5, if the measured $O_2/H_2S$ molar ratio is less than about 1.5; (iii) measuring the relative humidity of the $H_2S$ containing gas stream to determine if the relative humidity is equal to or greater than about 50%; (iv) adding water to the $H_2S$ containing gas stream to achieve a relative humidity of about 50%, if the measured relative humidity is less than 50%; and subsequently (v) contacting the $H_2S$ containing gas stream with a mixed metal oxy-hydroxide $H_2S$ removal media comprising zinc, iron, and silicon. Preferably, according to one embodiment of the invention, the mean pore volume of the media is equal to or greater than 0.25 $cm^3/g$. According to some embodiments, the $H_2S$ removal capacity of the media is equal to or greater than 200 mg $H_2S$ removed per gram of media and preferably, equal to or greater than 300 mg $H_2S$ removed per gram of media.

According to other embodiments, the present invention comprises processes for removing $H_2S$ from gas streams containing $H_2S$, the processes comprising (i) measuring the $O_2/H_2S$ molar ratio in the $H_2S$ containing gas stream to determine if the $O_2/H_2S$ molar ratio is less than about 1.5; (ii) mixing air or oxygen into the $H_2S$ containing gas stream at a rate to achieve an $O_2/H_2S$ molar ratio equal to or greater than about 1.5 in the $H_2S$ containing gas stream, if the measured $O_2/H_2S$ molar ratio is less than about 1.5; (iii) measuring the relative humidity of the $H_2S$ containing gas stream to determine if the relative humidity is greater than about 50% in the $H_2S$ containing gas stream; (iv) removing water from the $H_2S$ containing gas stream if the measured relative humidity is equal to or greater than about 50% in the $H_2S$ containing gas stream; and subsequently (v) contacting the $H_2S$ containing gas stream with a mixed metal oxy-hydroxide $H_2S$ removal media comprising copper, iron and silicon. Preferably, according to one embodiment of the invention, the mean pore volume of the media is equal to or greater than 0.25 $cm^3/g$. According to some embodiments, the $H_2S$ removal capacity of the media is equal to or greater than 200 mg $H_2S$ removed per gram of media and preferably, equal to or greater than 300 mg $H_2S$ removed per gram of media.

According to further embodiments, the present invention comprises processes for removing $H_2S$ from gas streams containing $H_2S$, the process comprising process for removing $H_2S$ from a gas stream containing $H_2S$, the process comprising (i) measuring the $O_2/H_2S$ molar ratio in the $H_2S$ containing gas stream to determine if the $O_2/H_2S$ molar ratio is less than about 1.5; (ii) mixing air or oxygen into the $H_2S$ containing gas stream at a rate to achieve an $O_2/H_2S$ molar ratio equal to or greater than about 1.5 in the $H_2S$ containing gas stream, if the measured $O_2/H_2S$ molar ratio is less than about 1.5; (iii) measuring the relative humidity of the $H_2S$ containing gas stream; (iv) adjusting the relative humidity of the $H_2S$ containing gas stream; and subsequently (v) contacting the $H_2S$ containing gas stream with a mixed metal oxy-hydroxide $H_2S$ removal media comprising one or more metals selected from the group consisting of magnesium, chromium, manganese, iron, cobalt, zinc and copper, plus one or more metals selected from the group consisting of aluminum, silicon, titanium and zirconium, wherein the relative humidity adjustment depends on the metals selected for the mixed metal oxy-hydroxide $H_2S$ removal media.

According to further embodiments, the present invention comprises processes for removing $H_2S$ from a gas stream containing $H_2S$, the process comprising (i) measuring an $O_2/H_2S$ molar ratio in the $H_2S$ containing gas stream to determine if the $O_2/H_2S$ molar ratio is less than about 1.5 in the $H_2S$ containing gas stream; (ii) mixing air or oxygen into the $H_2S$ containing gas stream if the $O_2/H_2S$ molar ratio is less than about 1.5 to achieve an $O_2/H_2S$ molar ratio equal to or greater than about 1.5 in the $H_2S$ containing gas stream, and subsequently (iii) contacting the $H_2S$ containing gas stream with a mixed metal oxy-hydroxide $H_2S$ removal media. Preferably, according to one embodiment of the invention, the mean pore volume of the media is equal to or greater than 0.25 $cm^3/g$. According to some embodiments, the $H_2S$ removal capacity of the media is equal to or greater than 200 mg $H_2S$ removed per gram of media and preferably equal to or greater than 300 mg $H_2S$ removed per gram of media.

According to some preferred embodiments, the $O_2/H_2S$ molar ratio in the $H_2S$ containing gas stream is preferably greater than about 1.5 and may be equal to or greater than about 5. According to other preferred embodiments, the relative humidity of the $H_2S$ containing gas stream may be greater than 50% and may be equal to or greater than 80%. According to further preferred embodiments, the relative humidity of the $H_2S$ containing gas stream may be less than 50% and may be less than 15% or even 0%. According to some embodiments, the $H_2S$ containing gas stream may be contacted with the mixed metal oxy-hydroxide $H_2S$ removal media at temperatures equal to or greater than about 15° C., 25° C., 35° C., and 45° C.

According to all of the above described embodiments, preferably the concentration of $H_2S$ in the gas streams comprise from less than about 1 ppm to greater than about 10,000 ppm, and/or the gas streams are contacted with the mixed metal oxy-hydroxide media at temperatures from about −25° C. to about 150° C. and/or the gas streams are contacted with the mixed metal oxy-hydroxide media at sub-ambient pressures to about 1,000 psig.

Mixed metal oxy-hydroxides are a class of reactive solids that include inter-dispersed mixtures of metal oxides and hydroxides. Mixed metal oxy-hydroxides are defined as porous solids comprised of inter-dispersed metals that contain both bridging oxygen and terminal hydroxyl groups. The bridging oxide portion of the structure is believed to promote porosity, while the hydroxide portion of the structure is believed to promote reactivity. Key properties of the mixed metal oxy-hydroxides may include a high concentration of terminal hydroxyl groups, superior porosity to the corresponding oxide, and low solubility in water.

In its simplest form, the mixed metal oxy-hydroxide may be expressed as:

$$X_1\text{-}M_1\text{-}O\text{-}M_2\text{-}X_2 \qquad (9)$$

where $M_1$ is selected from magnesium, chromium, manganese, iron, cobalt, zinc or copper and $M_2$ is selected from magnesium, chromium, manganese, iron, cobalt, zinc, copper, silicon, aluminum, titanium or zirconium. $M_1$ is different from $M_2$. $X_1$ and $X_2$ are each independently $-(OH)_n$ or $-(O\text{-}M_{1 \ or \ 2})_y\text{-}(OH)_n$ where: n is a value dependent on the valency of the terminal metal to which the hydroxyl group is attached, optionally, n is 1, 2, 3, 4, 5, or 6; and y is a value from 0 to 100 or more. As an example, a zinc-silicon oxy-hydroxide may be represented as:

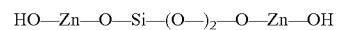

$$HO\text{—}Zn\text{—}O\text{—}Si\text{—}(O\text{—})_2\text{—}O\text{—}Zn\text{—}OH \qquad (10)$$

In any of the mixed metal oxy-hydroxides, the first metal is optionally present at 10% to 99% the atomic percentage of metal in the composition; and further including a second metal linked to the first metal by a bond including an oxygen; the second metal present at 1% to 90% atomic percent metal. In any aspect, the first metal is optionally present at 50 to 90 atomic percent metal in the composition. Optionally, the second metal present at 10 to 50 atomic percent metal. In some aspects, the second metal is silicon, optionally in a composition where the first metal is present at 50 to 90 atomic percent metal in said composition.

Mixed metal oxy-hydroxides may be prepared by precipitation techniques. Precipitation involves contacting an acidic mixed metal aqueous solution, such as, for example, chlorides of iron and zinc, with an alkaline solution, such as, for example, lithium hydroxide, sodium hydroxide, potassium hydroxide, ammonium hydroxide, sodium silicate, sodium aluminate, or mixtures thereof at a near constant pH or over a pH range, as necessary to bring about the precipitation reactions leading to the formation of the oxy-hydroxide. The oxy-hydroxide is readily separated from solution by filtration. In some aspects, it is necessary to control the pH of the precipitation in order to bring about the appropriate co-precipitation, control the porosity and/or optimize the fraction of terminal hydroxyl groups. Upon completion, it is often desired to wash the product oxy-hydroxide in order to remove occluded metal salts, for example, sodium chloride.

Typically, reactive materials are comprised of an inert porous substrate onto which reactive moieties are impregnated. In the case of the mixed metal oxy-hydroxide described herein, the substrate is preferably mainly comprised of reactive moieties, namely terminal hydroxyl groups, which provide exceptional $H_2S$ removal properties.

The novel processes described herein involve contacting $H_2S$ laden process streams (gas phase) with a bed containing a mixed metal oxy-hydroxide of the present disclosure. The level of $H_2S$ in the process stream may vary widely, from as little as less than 1 ppm to greater than 10,000 ppm on a volume basis. The make-up of the process streams containing $H_2S$ may also vary widely, depending on the application for which $H_2S$ removal is required. As an example, biogas contains typically 5 to greater than 3,000 ppm $H_2S$ along with methane, carbon dioxide and water, plus higher molecular weight hydrocarbons, oxygen, and other impurities. Natural gas contains lower levels of $H_2S$. Sewer gas also contains lower levels of $H_2S$, and also contains ammonia, methane, carbon monoxide, carbon dioxide, sulfur dioxide and oxides of nitrogen, with the balance air.

Water and oxygen are desired constituents of the process streams. Should the concentration of water and/or oxygen prove insufficient, these constituents may be added to the process steams to improve the $H_2S$ capacity of the mixed metal oxy-hydroxide. Alternatively, should the process streams possess insufficient oxygen, and it is undesirable or not feasible to add oxygen to the process steams, the mixed metal oxy-hydroxide may be regenerated by taking the media off-line and exposing the media to flowing, humid air at a sufficient flow rate and temperature to regenerate the media in a manner consistent with reactions described in equations 4 through 6 above. As said reactions are exothermic, temperature control is necessary in order to avoid over heating the media. Temperature control may be accomplished by a number of techniques. In one technique, the media is first wetted to saturation with liquid water, then exposed to air flowing at a flow rate necessary to regenerate the media.

DETAILED DESCRIPTION OF THE PREFERRED EMBODIMENTS OF THE INVENTION $H_2S$ is present in a number of process streams including those associated with natural gas, biogas, sewer gas and the like. $H_2S$ may also be present in ambient air as a result of gas leaks, etc. The novel processes described herein relate to the removal of $H_2S$ from process streams and involve contacting the $H_2S$ laden stream with a mixed metal oxy-hydroxide leading to the formation of metal sulfides and elemental sulfur. The reactive media employed by the novel process is a mixed metal oxy-hydroxide. Mixed metal oxy-hydroxides are defined as porous solids comprised of inter-dispersed metals that contain both bridging oxygen and terminal hydroxyl groups. The bridging oxide portion of the structure is believed to promote porosity, while the hydroxide portion of the structure is believed to promote reactivity. Key properties of the mixed metal oxy-hydroxides may include a high concentration of terminal hydroxyl groups, improved porosity, and low solubility in water.

Bridging oxygen is defined as an oxygen atom bonded between two metal atoms so as to form a metal-oxygen-metal bond ($-M_1-O-M_2-$) where $M_1$ and $M_2$ may be the same or different metals. Terminal hydroxyl groups are defined as a hydroxyl group that terminates a metal atom forming a $M-(OH)_n$ functional group where n is an integer between 1 and 3. Bridging oxygen has been found to be relatively inert while terminal hydroxyl groups have been found to be highly reactive in their ability to remove gas phase contaminants (Peterson and Rossin, *Ind. Eng. Chem. Res.* 51 (2012) 2675).

Bridging oxygen is believed to promote porosity, while the terminal hydroxyl groups are believed to promote chemical reactivity as necessary for the removal of $H_2S$. An optimized media is one that balances reactivity and porosity. The presence and relative quantities of bridging and terminal hydroxyl groups can be ascertained using X-ray photoelectron spectroscopy (XPS). XPS provides information related to the elemental speciation, which for the case at hand can be determined by mathematical analysis of the oxygen 1 s photoelectron peak. Mathematical analysis of the oxygen 1 s photoelectron peak, namely peak deconvolution, can yield information related to the chemical state of oxygen (van den Brand, et al., *Surf. Int. Anal* 36 (2004) 81).

According to some embodiments of the invention, mixed metal oxy-hydroxides effective in the removal of $H_2S$ may comprise at least one metal selected from magnesium, chromium, manganese, iron, cobalt, zinc or copper. According to some embodiments of the invention, if only one metal from the above list is selected, the mixed metal oxy-hydroxide may also comprise aluminum, silicon, titanium or zirconium, or mixtures thereof. In a preferred formulation, the mixed metal oxy-hydroxide comprises at least one metal selected from iron, zinc or copper and promoted with at least one metal selected from aluminum, silicon, titanium or zirconium. In a more preferred formulation, the mixed metal oxy-hydroxide comprises at least one metal selected from iron, zinc or copper and promoted with silicon. In an even more preferred formulation, the mixed metal oxy-hydroxide comprises iron and zinc, or iron and copper, promoted with silicon. The iron/zinc/silicon formulation may be preferred when a process stream contains water at a relative humidity greater than 50%, while the iron/copper/silicon formulation may be preferred when a process stream contains water at a relative humidity less than 50%.

While not wishing to be bounded by any theory, the metals magnesium, chromium, manganese, iron, cobalt, zinc or copper included in the formulation are believed to promote the formation of the corresponding sulfide when contacted with $H_2S$, while the elements aluminum, silicon, titanium and zirconium are believed to promote porosity. It is also believed that the metals are inter-dispersed. It was found that mixtures of metals yield materials with $H_2S$ removal properties superior to that of the pure components.

The composition of the mixed metal oxy-hydroxide may vary greatly. As used herein, "weight percent metal associated with the composition" refers to the percentage of the metal as the weight of metal divided by the total weight of metal. The oxygen and/or water content of the material is not included in this calculation. The composition can range from about 10% by weight to 100% by weight percent metal of magnesium, chromium, manganese, iron, cobalt, zinc or copper, or mixtures thereof. The balance of the material is comprised of at least one metal selected from aluminum, silicon, titanium or zirconium. In a preferred formulation, the mixed metal oxy-hydroxide comprises between 50% and 90% by weight iron, zinc or copper, or mixtures thereof, with the balance silicon.

Mixed metal oxy-hydroxides may be prepared by contacting a soluble salt solution (aqueous) of metal chlorides, sulfates, nitrates, fluorides, acetates, oxalates, etc. with an alkaline solution (aqueous) at a pH or pH range sufficient to bring about co-precipitation of the metals. The alkaline solution may include lithium hydroxide, sodium hydroxide, potassium hydroxide, cesium hydroxide, ammonium hydroxide, sodium aluminate, sodium silicate, or mixtures thereof. Sodium hydroxide is a preferred alkali. Precipitation of mixed metal oxy-hydroxides may occur via reactions as described below when conducted at a pH in which the metal hydroxide is insoluble in solution, leading to precipitation by the following exemplary reaction scheme:

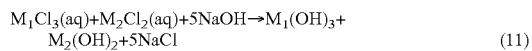

$$M_1Cl_3(aq)+M_2Cl_2(aq)+5NaOH \rightarrow M_1(OH)_3+M_2(OH)_2+5NaCl \quad (11)$$

The above reaction is followed by dehydration, also referred to as polycondensation, to yield the mixed metal oxy-hydroxide by the following exemplary reaction scheme:

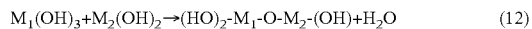

$$M_1(OH)_3+M_2(OH)_2 \rightarrow (HO)_2\text{-}M_1\text{-}O\text{-}M_2\text{-}(OH)+H_2O \quad (12)$$

Mixed metal oxy-hydroxides may be prepared via precipitation. For example, mixed metal oxy-hydroxides may be prepared by contacting a soluble acidic metal solution, such as, for example, metal chloride, nitrate, sulfate, fluoride, oxalate or acetate, with a caustic solution, such as, for example, sodium hydroxide or potassium hydroxide, at a pH or over a pH range suitable to bring about precipitation and subsequent polycondensation reactions as previously described. Aluminum or silicon, or mixtures thereof, may be added, e.g., as alkaline solutions of sodium aluminate and sodium silicate, respectively, or mixtures thereof. Alternatively, a sodium silicate or sodium aluminate solution may be used to bring about precipitation. As it may be desired for the mixed metal oxy-hydroxide to have a high concentration of terminal hydroxyl groups, the precipitation should be performed at a basic pH, such as greater than 7 but less than 14. In one method of preparation, an acidic metal solution, such as, for example, a mixture of iron chloride and zinc chloride, or iron chloride and copper chloride, is added over a period of time to an alkaline solution while the pH is maintained between 7.0 and 14.0, preferably between 7.0 and 11.0, and more preferably between 8.5 and 9.5.

Forms of magnesium, chromium, manganese, iron, cobalt, zinc or copper useful in the present invention may include chlorides, sulfates, nitrates and oxides, with chlorides and sulfates being preferred. Forms of silicon useful in the present invention may include sodium silicate, fumed silica, silicon dioxide, and colloidal silica solutions. Sodium silicate is preferred. Forms of aluminum useful in the present invention may include sodium aluminate, aluminum dioxide, aluminum hydroxide, aluminum nitrate, aluminum sulfate and pseudo-boehmite. Sodium aluminate and pseudo-boehmite are preferred. Forms of titanium useful in the present invention may include titanium dioxide, titanium oxysulfate, titanium oxychloride and titanium oxynitrate. Titanium oxysulfate is preferred. Forms of zirconium useful in the present invention may include zirconium hydroxide, zirconium oxychloride, zirconium oxynitrate and zirconium oxide. Zirconium oxychloride is preferred.

In an alternative preparation, the pH of the acidic metal solution may be increased from its initial value (acidic) to the target pH using, e.g., an alkaline solution. For example, an iron-zinc oxy-hydroxide may be prepared from a solution prepared by dissolving iron chloride and zinc chloride in deionized (DI) water by adding an appropriate amount of alkali solution necessary to raise the pH to the target value necessary to bring about precipitation and subsequent polycondensation.

Precipitation reactions such as those described herein are generally exothermic. As a result, it may be necessary to combine the solutions slowly as a means of controlling the temperature. Additionally, cooling may be employed. For example, cooling coils may be inserted into the mixing vessel, and/or the solutions may be cooled to reduced temperatures prior to precipitation.

Upon completion of the precipitation, the solids are filtered from solution and washed with water in order to remove residual alkali. In order to more effectively remove the alkali, the solids can be washed with a dilute (less than 0.1 molar) acid solution, such as nitric or acetic acid.

Drying is a key step in the operation, at too high of temperature, the porous metal oxy-hydroxide may begin to decompose to the corresponding oxide. Said excessive drying may decrease the porosity of the resulting solid plus possibly remove terminal hydroxyl groups, which may be necessary to facilitate chemical reactions. Ideally, the mixed metal oxy-hydroxide is dried at temperatures below about 150° C. to the target moisture content, typically less than 10% water by weight. The upper temperature limit employed in the drying operation may depend upon the composition of the mixed metal oxy-hydroxide and the duration of the exposure.

The pore volume, rather than the surface area, was found to be an important physical property in promoting the removal of $H_2S$ using a mixed metal oxy-hydroxide of the present invention. While not wishing to be bound to any particular theory, it is believed that pore volume is necessary to accommodate product elemental sulfur formed during the regeneration reactions involving water and oxygen. As such, formulations that maximized pore volume were discovered to be most preferred.

Mixed metal oxy-hydroxides may be prepared as powders and as such, may require processing to put the material in a usable form, such as, for example, granules, beads and extrudates. Granules may be prepared by processing the dried powder as tablets using a tableting machine, with the resulting tablets crushed and sieved to the desired mesh size. Alternatively, selected preparations were discovered to yield doughs, which, when dried to a target moisture content, may be processed as extrudates or beads. Binder may optionally be added to increase hardness of the resulting mixed metal oxy-hydroxide.

The novel processes described herein involve contacting $H_2S$ laden process streams with a mixed metal oxy-hydroxide of the present invention at a contact time sufficient to bring about the removal of $H_2S$ for a sufficient period of time. The composition of the process streams may vary significantly based on the application. As a result, the concentration of $H_2S$ may be as little as less than 1 ppm to greater than 10,000 ppm. Concentrations of $H_2S$ ranging from 10 to about 1,000 ppm are preferred, while $H_2S$ concentrations ranging from about 10 to about 500 ppm are even more preferred.

The novel processes described herein may be readily applied to the removal of $H_2S$ from streams of air, or the removal of $H_2S$ from process streams containing threshold levels of $O_2$, $N_2$, He, $H_2$, $CH_4$, $CO_2$, $H_2O$ vapor, miscellaneous hydrocarbons or mixtures thereof. Process streams containing $O_2$ are preferred in the practice of the present invention. Oxygenated process streams with an $O_2/H_2S$ molar ratio greater than 1.5 are more preferred in the practice of the present invention. And oxygenated process streams with an $O_2/H_2S$ molar ratio greater than 5 are most preferred in the practice of the present invention. Should the concentration of $O_2$ present in a process stream prove insufficient, $O_2$, e.g., air, may be added to the process stream to oxygenate the same. This may be accomplished by blending air into a process stream up-stream of the mixed metal oxy-hydroxide bed at a point to allow sufficient mixing. The flow rate of air may be selected so that the $O_2/H_2S$ molar ratio up-stream of the mixed metal oxy-hydroxide bed is greater than 1.5, and preferably greater than about 5 according to some embodiments of the invention.

Process streams containing water vapor are also preferred. When employing a mixed metal oxy-hydroxide comprised of magnesium, chromium, manganese, iron, cobalt, or zinc, or mixtures thereof, it has been found that the relative humidity of the process stream should be greater than 50%. Should insufficient water be present in a process stream, water may always be added upstream of the mixed metal oxy-hydroxide bed at a location to allow for sufficient mixing. It is unnecessary that the process stream be saturated with water.

Should a process stream contain insufficient water, and it is not desired or not feasible to add water to the process stream, it has been found that the mixed metal oxy-hydroxide should be comprised of at least 10% by weight copper (metal basis) and preferably greater than 50% by weight (metal basis) copper according to some embodiments of the invention.

According to some embodiments, process streams containing both $H_2O$ vapor and $O_2$ are even more preferred in the practice of the present invention. According to further embodiments, process streams with a relative humidity greater than 50% and an $O_2/H_2S$ molar ratio greater than 1.5 are more preferred in the practice of the present invention. Even more preferred in the practice of some embodiments of the present invention, are process streams with a relative humidity greater than 50% and an $O_2/H_2S$ molar ratio greater than about 5. Should insufficient water and/or $O_2$ be present in the process stream, water and/or $O_2$ may be added upstream of the mixed metal oxy-hydroxide bed at a location to allow for sufficient mixing. $O_2$ may be added in the form of air. It is not necessary that the process stream be saturated with water.

The $H_2S$ removal capability of the mixed metal oxy-hydroxide may increase as the temperature of a process stream is increased. Should the temperature of a process stream be insufficient, or there is a desire to operate the mixed metal oxy-hydroxide at a greater efficiency, the temperature of the process stream entering the mixed metal oxy-hydroxide bed may be increased using known techniques. For example, a heater may be installed up-stream of the bed. In another example, a heater and a recuperator may be installed. The temperature of a process stream that contacts the mixed metal oxy-hydroxide bed may be as low as −25° C. and as high as 150° C., with temperatures between about 15° C. and 65° C. being preferred according to some embodiments, and temperatures between 35° C. and 65° C. being more preferred for some embodiments. When a process stream is above ambient temperature, it may be desired to insulate the vessel containing the mixed metal oxy-hydroxide.

The pressure of a process stream that contacts the mixed metal oxy-hydroxide may range from sub-atmospheric to greater than 1,000 psig, with pressures ranging from atmospheric to less than about 100 psig being preferred according to some embodiments. Operation at higher pressure, while feasible, may require greater capital costs due to the pressure regulations associated with the vessel containing the mixed metal oxy-hydroxide media.

When removing $H_2S$ from a process stream on a continuous or near-continuous basis, the contact time will typically be based on the target change-out period of the mixed metal oxy-hydroxide media contained in the bed. Typical change-out periods range from 30 days up to and in excess of 1 year; however, shorter and longer change-out periods may be targeted. This period of time will be governed by the flow rate of a process stream, the concentration of $H_2S$ in the process stream, and the capacity of the media. Other factors affecting the contact time may include but are not limited to the allowable pressure drop through the mixed metal oxy-hydroxide bed. As a result, the contact time may be as little as a few tenths of a second for process streams containing low levels of $H_2S$ and employing frequent change-out, to up to and in excess of several minutes for process streams containing higher levels of $H_2S$ and desiring longer change-out periods.

The processes may be operated as back-up systems to another $H_2S$ abatement processes, such as, for example, a bio-filter. Alternatively, the processes may be operated as safety systems designed to remove $H_2S$ vented from a process in the event of a catastrophic failure.

The media may also be used in respirator cartridges worn by individuals entering or working in $H_2S$ contaminated environments, such as e.g., sewers, waste water treatment plants, and chemical processing plants.

Lead-lag processes may be employed to fully utilize the capacity of the media. Lead-lag processes are known to one skilled in the art. In its simplest form, the lead-lag process employs two beds containing the target volume of mixed metal oxy-hydroxide media. A $H_2S$ laden process stream flows into the first bed (Bed 1), then exits the first bed (Bed 1) and flows into the second bed (Bed 2). When the effluent concentration of $H_2S$ in the stream exiting Bed 1 is nearly equal to that of the feed, the mixed metal oxy-hydroxide in Bed 1 is considered spent. At this point in time, the process flow is diverted directly into Bed 2, with Bed 1 taken off-line. The mixed metal oxy-hydroxide in Bed 1 is either replaced or regenerated. Once the mixed metal oxy-hydroxide in Bed 1 is replaced or regenerated, the process flow exiting Bed 2 is diverted to Bed 1. Once the mixed metal oxy-hydroxide in Bed 2 is considered spent, Bed 2 is taken off-line and the process flow is diverted directly into Bed 1. The operations are then repeated.

When insufficient $O_2$ is associated with a process stream, and it is either not desired or feasible to add $O_2$ to the process stream, the $H_2S$ removal capacity of the mixed metal oxy-hydroxide has been discovered to be reduced. The $H_2S$ removal capacity of the mixed metal oxy-hydroxide has been discovered to be restored through regeneration. The regeneration process may involve first saturating the bed of mixed metal oxy-hydroxide with liquid water. This is performed to help control the temperature and limit thermal runaway. Upon saturation, the mixed metal oxy-hydroxide may be exposed to a flowing oxygen source, such as air, at a flow rate necessary to facilitate the necessary reactions leading to the formation of the metal sulfite. According to some embodiments, it is preferred that the oxygen source contain water vapor, preferably with a relative humidity greater than 50%. During the regeneration operation, water may be continuously or periodically sprayed over the bed of mixed metal oxy-hydroxide in order to better control the temperature.

The compositions of the mixed metal oxy-hydroxides are expressed as weight percent metal and is calculated by dividing the weight of the individual metal by the total weight of all metals. Oxygen is not considered in these calculations.

EXAMPLES

Example 1: Preparation and Evaluation of Zinc Oxy-Hydroxide (Comparative)

250 g of zinc chloride was dissolved in 400 ml of DI water. 1 liter of DI water was added to a 1 gallon pail. A cooling coil extended into the water and was used to control the temperature at about 20° C. The water was mixed using a high shear mixer. Using a peristaltic pump, the zinc chloride solution was metered into the water while mixing. The resulting slurry was maintained at a pH of 9 by adding a 50% NaOH solution. Once complete, the resulting slurry was allowed to mix for 4 hours, then allowed to stand overnight. In the morning, the solution was filtered, then washed with DI water to remove the excess salts. Following washing, the resulting solids were dried at 90° C. overnight. The resulting solids were crushed and sieved to yield 20×40 mesh particles (density=0.92 g/cm$^3$). The surface area of the sample was 16 m$^2$/g and the pore volume was 0.04 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was terminated following 12 minutes of exposure, at which point the effluent concentration of $H_2S$ exceeded 350 mg/m$^3$. The $H_2S$ removal capacity of the media was calculated to be 20 mg/g.

Example 2: Preparation and Evaluation of Iron Oxy-Hydroxide (Comparative)

180 g of iron (III) chloride hexahydrate was dissolved in 1,000 ml of DI water. To the solution was added 30 g of a 50% $H_2SO_4$ solution. A cooling coil extended into the solution and was used to control the temperature at about 20° C. The solution was mixed using a high shear mixer. The pH of the solution was increased to 9 by slowly adding of a 10% KOH solution using a peristaltic pump. Once complete, the resulting slurry was allowed to mix for 5 hours, at which time the slurry was filtered, then washed with DI water to remove the excess salts. Following washing, the resulting solids were dried at 90° C. overnight. The resulting solids were crushed and sieved to yield 20×40 mesh particles (density=0.54 g/cm$^3$). The surface area of the sample was 44 m$^2$/g and the pore volume was 0.14 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was terminated following 61 minutes of exposure, at which point the effluent concentration of $H_2S$ exceeded 350 mg/m$^3$. The $H_2S$ removal capacity of the media was calculated to be 172 mg/g.

Example 3: Preparation and Evaluation of 85% Fe-15% Si Oxy-Hydroxide 30 ml of HCl solution was added to 500 ml DI water in a Teflon jar. To the solution was added 118.5 g sodium silicate solution (13.1% Si). Once dissolved, 476 g of iron (III) chloride hexahydrate (18.9% Fe) was added. The volume was increased to 1.5 liters using DI water. The pH of the final solution was less than 1.0. 1 liter of DI water was added to a 1 gallon pail. A cooling coil extended into the water and was used to control the temperature at about 20° C. The water was mixed using a high shear mixer. The pH of the slurry was increased to 13.5 using a 50% KOH solution. The iron-silicon solution was metered into the KOH solution using a peristaltic pump at a rate of about 35-40 ml/min, with the pH maintained at 13.5 using a 50% KOH solution until about 200 ml of the iron-silica solution remained. At this time, the pH was allowed to decrease to 12.5, and was maintained at this value using the KOH solution until the iron-silicon solution was exhausted. The slurry was allowed to mix for 7 hours, then allowed to stand overnight. In the morning, the slurry was filtered, then washed with DI water to remove the excess salts. The resulting material was dried at 90° C. overnight, then crushed and sieved to 20×40 mesh granules (density=0.68 g/cm$^3$). The surface area of the sample was 292 m$^2$/g and the pore volume was 0.27 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was terminated following 140 minutes of exposure, at which point the effluent concentration of $H_2S$ exceeded 300 mg/m$^3$. The $H_2S$ removal capacity of the media was calculated to be 325 mg/g.

Example 4: Preparation and Evaluation of 75% Zn-25% Si Oxy-Hydroxide 70 ml of HCl solution was added to 400 ml DI water in a Teflon jar. To the solution was added 191.3 g sodium silicate solution (13.1% Si). Once dissolved, 250 g of zinc chloride solution (30.0% Zn) was added. The volume was increased to 750 ml using DI water. The pH of the final solution was 2.1. 2 liters of DI water was added to a 1 gallon pail. A cooling coil extended into the water and was used to control the temperature at about 20° C. The water was mixed using a high shear mixer. The pH of the slurry was increased to 12.5 using a 50% NaOH solution. The zinc-silicon solution was metered into the NaOH solution using a peristaltic pump at a rate of about 30 ml/min, with the pH maintained at 12.5 using a 50% NaOH solution. Upon completion, the slurry was allowed to mix for 6 hours, then allowed to stand overnight. In the morning, the slurry was filtered, then washed with DI water to remove the excess salts. The resulting material was dried at 90° C. overnight, then crushed and sieved to 20×40 mesh granules (density=0.80 g/cm$^3$). The surface area of the sample was 112 m$^2$/g and the pore volume was 0.50 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was terminated following 140 minutes of exposure, at which point the effluent concentration of $H_2S$ exceeded 200 mg/m$^3$. The $H_2S$ removal capacity of the media was calculated to be 290 mg/g.

Example 5: Preparation and Evaluation of 76% Zn-24% Al Oxy-Hydroxide 110 g of zinc oxide was dissolved in 500 ml DI water using HCl. The final volume of the solution was 750 ml. 300 g of sodium aluminate solution (10.6% Al) and 50 ml of a 50% NaOH solution were added to 1 liter of DI water in a 1 gallon pail. A cooling coil extended into the water and was used to control the temperature at about 20° C. The solution was mixed using a high shear mixer. The zinc chloride solution was then added to the sodium aluminate solution at a rate of approximately 25 ml/min using a peristaltic pump. Upon completion, the pH of the slurry was approximately 12.0. The slurry was allowed to mix for 5 hours, then allowed to stand overnight. In the morning, the slurry was filtered, then washed with DI water to remove the excess salts. The resulting material was dried at 90° C. overnight, then crushed and sieved to 20×40 mesh granules (density=0.92 g/cm$^3$). The surface area of the sample was 162 m$^2$/g and the pore volume was 0.26 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was terminated following 96 minutes of exposure, at which point the effluent concentration of $H_2S$ exceeded 350 mg/m$^3$. The $H_2S$ removal capacity of the media was calculated to be 178 mg/g.

Example 6: Preparation and Evaluation of 67% Cu-33% Fe Oxy-Hydroxide

To 1 liter of DI water was added 393 g of copper sulfate pentahydrate (25.5% Cu). Once dissolved, 264.5 g iron(III) chloride hexahydrate (18.9% Fe) was added. The resulting mixture was stirred until all salts were completely dissolved. 1.2 liters of DI water was added to a 1 gallon pail. A cooling coil extended into the water and was used to control the temperature at about 20° C. The pH of the water was increased to 12.5 using a 50% KOH solution. The iron/copper/silicon solution was then added to the KOH/water solution over a 30 min time period using a peristaltic pump. During addition, the pH of the slurry was maintained at 12.5 using the 50% KOH solution in order to bring about precipitation. Upon completion, the resulting slurry was allowed to mix for an additional 6 hours, at which point mixing was halted, and the slurry was allowed to stand overnight. In the morning the slurry was filtered, with the resulting solids washed with DI water to remove the excess salts. The resulting material was dried at 80° C. overnight, then crushed and sieved to 20×40 mesh granules (density=1.08 g/cm$^3$). The surface area of the sample was 164 m$^2$/g and the pore volume was 0.23 cm$^3$/g.

The resulting sample (as 20×40 mesh granules) was evaluated for its ability to remove $H_2S$. 7.5 cm$^3$ of media was loaded into a 3.1 cm inside diameter test cell. The media was pre-equilibrated under flowing, humid (15% RH) air at 25° C. for 1 hour prior to initiating the $H_2S$ flow. The media was then challenged with a process stream comprised of 4,000 ppm $H_2S$ in humid (15% RH) air flowing at 3 liters per minute. The $H_2S$ removal capacity (mg $H_2S$ removed per g media) was 172 mg/g.

Example 7: Preparation and Evaluation of 60% Cu-30% Fe-10% Si Oxy-Hydroxide 76.5 g of a sodium silicate solution (13.1% Si) was dissolved in 600 ml of DI water using HCl. To the resulting solution was added 400 ml of DI water and 393 g of copper sulfate pentahydrate (25.5% Cu). Once dissolved, 264.5 g iron(III) chloride hexahydrate (18.9% Fe) was added. The resulting mixture was stirred until all salts were completely dissolved. 1.2 liters of DI water was added to a 1 gallon pail. A cooling coil extended into the water and was used to control the temperature at about 20° C. The pH of the water was increased to 12.5 using a 50% KOH solution. The iron/copper/silicon solution was then added to the KOH/water solution over a 30 min time period using a peristaltic pump. During addition, the pH of the slurry was maintained at 12.5 using the 50% KOH solution in order to bring about precipitation. Upon completion, the resulting slurry was allowed to mix for an additional 6 hours, at which point mixing was halted, and the slurry was allowed to stand overnight. In the morning the slurry was filtered, with the resulting solids washed with DI water to remove the excess salts. The resulting material was dried at 80° C. overnight, then crushed and sieved to 20×40 mesh granules (density=0.72 g/cm$^3$). The surface area of the sample was 273 m$^2$/g and the pore volume was 0.45 cm$^3$/g.

The resulting sample (as 20×40 mesh granules) was evaluated for its ability to remove $H_2S$ in air at discrete relative humidity values. 7.5 cm$^3$ of media was loaded into a 3.1 cm inside diameter test cell. The media was pre-equilibrated under flowing, humid (80% RH) air at 25° C. for 1 hour prior to initiating the $H_2S$ flow. The media was then challenged with a process stream comprised of 4,000 ppm $H_2S$ in humid (80% RH) air flowing at 3 liters per minute. The test was repeated at 50% RH and 15% RH. The $H_2S$ removal capacity (mg $H_2S$ removed per g media) as a function of the RH of the process stream is presented in the table below. Results demonstrate that the media performs optimally when the RH is less than 50%.

| RH | H$_2$S Capacity |
|---|---|
| 15% | 541 mg/g |
| 50% | 485 mg/g |
| 80% | 310 mg/g |

Example 8: Preparation and Evaluation of 50% Zn-25% Fe-25% Si Oxy-Hydroxide

To 1 liter of DI water was added 180 g of a 50% H$_2$SO$_4$ solution. 690 g of sodium silicate solution (13.1% Si) was slowly added H$_2$SO$_4$ solution and mixed. To the resulting silicon solution was added 600 g of a zinc chloride solution (30% Zn) followed by the addition of 690 g of an iron chloride solution (13.0% Fe). To a 5 gallon pail was added 3.5 liters of DI water. A cooling coil extended into the water and was used to control the temperature at about 20° C. The pH of the water was increased to 9 using a 50% NaOH solution. Using a peristaltic pump, the zinc-iron-silicon solution was added to the NaOH/H$_2$O solution while mixing over a 60 minute period. During the addition, the pH was maintained at 9 using a 50% NaOH solution. Mixing was halted following 4 hours, and the resulting slurry was filtered. The resulting solids were washed with DI water to remove the excess salts, then dried at 90° C. overnight. The resulting solids were then crushed and sieved to 20×40 mesh granules (density=0.46 g/cm$^3$). The surface area of the sample was 215 m$^2$/g and the pore volume was 0.41 cm$^3$/g.

The resulting sample (as 20×40 mesh granules) was evaluated for its ability to remove H$_2$S in air at discrete relative humidity values. 22.5 cm$^3$ of media was loaded into a 3.1 cm inside diameter test cell. The media was pre-equilibrated under flowing, humid (80% RH) air at 25° C. for 1 hour prior to initiating the H$_2$S flow. The media was then challenged with a process stream comprised of 4,000 ppm H$_2$S in humid (e.g., 80% RH) air flowing at 3 liters per minute. The test was repeated at a humid 50% RH, 15% RH and 0%. The H$_2$S removal capacity (mg H$_2$S removed per g media) as a function of the RH of the process stream is presented in the table below. The capacity is determined to the point where the effluent concentration exceeds 350 mg/m$^3$. Results demonstrate that the media performs optimally in air when the RH is greater than 50%.

| RH | H$_2$S Capacity |
|---|---|
| 0% | 58 mg/g |
| 15% | 139 mg/g |
| 50% | 850 mg/g |
| 80% | 875 mg/g |

The resulting sample (as 20×40 mesh granules) was evaluated for its ability to remove H$_2$S in N$_2$ at discrete relative humidity values. 22.5 cm$^3$ of media was loaded into a 3.1 cm inside diameter test cell. The media was pre-equilibrated under flowing, humid (80% RH) N$_2$ at 25° C. for 1 hour prior to initiating the H$_2$S flow. The media was then challenged with a process stream comprised of 4,000 ppm H$_2$S in humid (80% RH) N$_2$ flowing at 3 liters per minute. The test was repeated at 50% RH, 15% RH and 0%. The H$_2$S removal capacity (mg H$_2$S removed per g media) as a function of the RH of the process stream is presented in the table below. The capacity is determined to the point where the effluent concentration exceeds 350 mg/m$^3$. Results demonstrate that the media performs optimally in N$_2$ when the RH is greater than 50%.

| RH | H$_2$S Capacity |
|---|---|
| 0% | 45 mg/g |
| 15% | 126 mg/g |
| 50% | 238 mg/g |
| 80% | 240 mg/g |

The resulting sample (as 20×40 mesh granules) was evaluated for its ability to remove H$_2$S in humid (80% RH) O$_2$/N$_2$ (0.3% O$_2$ in N$_2$) over a range of temperatures. 7.5 cm$^3$ of media was loaded into a 3.1 cm inside diameter test cell. The media was pre-equilibrated under flowing, humid (80% RH) air at the target temperature for 1 hour prior to initiating the H$_2$S flow. The media was then challenged with a process stream comprised of 1,000 ppm H$_2$S in humid (80% RH) O$_2$/N$_2$ flowing at 3 liters per minute. The test was performed at temperatures between 0 and 45° C. The H$_2$S removal capacity (mg H$_2$S removed per g media) as a function of the exposure temperature is presented in the table below. The capacity is determined to the point where the effluent concentration exceeds 350 mg/m$^3$. Results demonstrate that the media is capable of removing H$_2$S over a range of temperatures.

| Temperature | H$_2$S Capacity |
|---|---|
| 0° C. | 341 mg/g |
| 15° C. | 885 mg/g |
| 25° C. | 952 mg/g |
| 35° C. | 1,039 mg/g |
| 45° C. | 1,129 mg/g |

The resulting sample (as 20×40 mesh granules) was evaluated for its ability to remove H$_2$S in a CO$_2$/CH$_4$ process stream at 80% RH. 7.5 cm$^3$ of media was loaded into a 3.1 cm inside diameter test cell. The media was pre-equilibrated under flowing, humid (80% RH) CO$_2$/CH$_4$ (40% CO$_2$, 60% CH$_4$) at 25° C. for 17 hour prior to initiating the H$_2$S flow. The media was then challenged with a process stream comprised of 4,000 ppm H$_2$S in humid (80% RH) air flowing at 3 liters per minute. The test was repeated in N$_2$ for comparison. The H$_2$S removal capacity (mg H$_2$S removed per g media) was determined to be 190 mg/g when tested in humid CO$_2$/CH$_4$ and 196 mg/g when tested in humid N$_2$. The capacity is determined to the point where the effluent concentration exceeds 350 mg/m$^3$. Results demonstrate that the media is able to function accordingly in a natural gas/biogas environment.

Example 9: Regeneration of 50% Zn-25% Fe-25% Si Oxy-Hydroxide

The 50% Zn-25% Fe-25% Si oxy-hydroxide of Example 8 was evaluated for its ability to be regenerated following H$_2$S exposure. 22.5 cm$^3$ of media was loaded into a 3.1 cm inside diameter test cell. The media was pre-equilibrated under flowing (80% RH) N$_2$ at 25° C. for 1 hour prior to initiating the H$_2$S flow. The media was then challenged with a process stream comprised of 4,000 ppm H$_2$S in humid (80% RH) N$_2$ flowing at 3 liters per minute. Upon completion of the exposure, defined at the point the effluent concentration of H$_2$S exceeded 350 mg/m$^3$, the test was halted and the media was regenerated. Regeneration was performed by first discontinuing the flow of $H_2S$ and $N_2$, then saturating the bed with water in-situ by dripping water onto the media. Once the media was fully saturated, air, flowing at 450 ml/min, was passed through the bed overnight at 65° C. The air contained about 3% water (v/v). In the morning, the bed of media was returned to 25° C., and the flow of $H_2S$ in humid $N_2$ was re-introduced. The exposure/regeneration operations were repeated a total of 4 times. The $H_2S$ removal capacity (mg $H_2S$ removed per g media) for each regeneration is presented in the table below. The capacity is determined to the point where the effluent concentration exceeds 350 mg/m$^3$. Results demonstrate that the process of exposing the spent media to air will restore a portion of the $H_2S$ removal capability.

| RH | $H_2S$ Capacity | Cummulative $H_2S$ Capacity |
| --- | --- | --- |
| 1$^{st}$ exposure | 240 mg/g | 240 mg/g |
| 2$^{nd}$ exposure | 104 mg/g | 343 mg/g |
| 3$^{rd}$ exposure | 100 mg/g | 443 mg/g |
| 4$^{th}$ exposure | 72 mg/g | 516 mg/g |
| 5$^{th}$ exposure | 45 mg/g | 561 mg/g |

The invention claimed is:

1. A process for removing $H_2S$ from a gas stream containing $H_2S$, the process comprising
   (i) assessing the $O_2/H_2S$ molar ratio in the $H_2S$ containing gas stream to determine if the $O_2/H_2S$ molar ratio is less than about 1.5;
   (ii) mixing air or oxygen into the $H_2S$ containing gas stream at a rate to achieve an $O_2/H_2S$ molar ratio equal to or greater than about 1.5, if the measured $O_2/H_2S$ molar ratio is less than about 1.5;
   (iii) assessing the relative humidity of the H2S containing gas stream to determine if the relative humidity is equal to or greater than about 50%;
   (iv) reducing the relative humidity of the $H_2S$ gas stream to less than about 50%, if the measured relative humidity is greater than 50%; and subsequently
   (v) contacting the $H_2S$ containing gas stream with a porous amorphous solid mixed metal oxy-hydroxide $H_2S$ removal media comprising copper and iron.

2. A process according to claim 1, wherein the mixed metal oxy-hydroxide $H_2S$ removal media has a $H_2S$ removal capacity equal to or greater than about 500 mg $H_2S$ removed per gram of media.

3. A process according to claim 1, wherein the mixed metal oxy-hydroxide $H_2S$ removal media has a pore volume equal to or greater than about 0.23 cm3/g.

4. A process according to claim 1, wherein the $H_2S$ containing gas stream is contacted with the mixed metal oxy-hydroxide $H_2S$ removal media at temperatures equal to or greater than about 15° C.

5. A process according to claim 1, wherein the $H_2S$ containing gas stream is contacted with the mixed metal oxy-hydroxide $H_2S$ removal media at temperatures equal to or greater than about 35° C.

6. A process according to claim 1, further comprising mixing air or oxygen into the $H_2S$ containing gas stream at a rate to achieve an $O_2/H_2S$ molar ratio equal to or greater than about 5.0 in the $H_2S$ containing gas stream, if the measured $O_2/H_2S$ molar ratio is less than about 1.5.

7. A process according to claim 1, wherein the mixed metal oxy-hydroxide $H_2S$ removal media comprises from about 60% to about 67% copper and from about 30% to about 33% iron.

8. A process according to claim 1, further comprising regenerating the mixed metal oxy-hydroxide $H_2S$ removal media by first wetting the media to saturation with water, followed by exposing the media to flowing air having a relative humidity of 50% or greater at a temperature of about 25° C. to about 150° C.

* * * * *